(12) United States Patent
Albl et al.

(10) Patent No.: US 11,165,308 B2
(45) Date of Patent: Nov. 2, 2021

(54) DRIVE MECHANISM AND AXLE DRIVE MECHANISM FOR A MOTOR VEHICLE

(71) Applicant: AUDI AG, Ingolstadt (DE)

(72) Inventors: Sebastian Albl, Gaimersheim (DE); Albert Scharlach, Oberdolling (DE)

(73) Assignee: AUDI AG, Ingolstadt (DE)

( * ) Notice: Subject to any disclaimer, the term of this patent is extended or adjusted under 35 U.S.C. 154(b) by 327 days.

(21) Appl. No.: 16/178,908

(22) Filed: Nov. 2, 2018

(65) Prior Publication Data

US 2019/0165647 A1   May 30, 2019

(30) Foreign Application Priority Data

Nov. 29, 2017   (DE) .......................... 102017221389.2

(51) Int. Cl.
| | | |
|---|---|---|
| *H02K 7/116* | (2006.01) | |
| *H02K 1/18* | (2006.01) | |
| *F16H 1/14* | (2006.01) | |
| *F16H 1/28* | (2006.01) | |
| *F16H 37/04* | (2006.01) | |
| *H02K 7/00* | (2006.01) | |
| *H02K 7/08* | (2006.01) | |

(Continued)

(52) U.S. Cl.
CPC ............... *H02K 7/116* (2013.01); *F16H 1/14* (2013.01); *F16H 1/28* (2013.01); *F16H 37/041* (2013.01); *H02K 1/185* (2013.01); *H02K 7/006* (2013.01); *H02K 7/085* (2013.01); *B60K 1/02* (2013.01); *B60K 17/04* (2013.01); *B60L 2220/46* (2013.01)

(58) Field of Classification Search
CPC ........ H02K 7/116; H02K 1/185; H02K 7/006; H02K 7/085; F16H 1/14; F16H 1/28; F16H 37/041; B60K 1/02
See application file for complete search history.

(56) References Cited

U.S. PATENT DOCUMENTS 1,613,053 A    1/1927  Lloyd
1,893,346 A *  1/1933  Winther ................. H02K 51/00
                                                    310/96

(Continued)

FOREIGN PATENT DOCUMENTS

DE              3140167 A1    4/1983
DE          102010017966 A1   10/2011

(Continued)

OTHER PUBLICATIONS

Examination Report dated Apr. 21, 2020, in corresponding European patent application No. 18 201 217.9 including partial machine-generated English language translation; 10 pages.

(Continued)

*Primary Examiner* — Jianchun Qin

(74) *Attorney, Agent, or Firm* — Maier & Maier, PLLC

(57) ABSTRACT

A drive mechanism for a motor vehicle, with a driven shaft and an electric machine, including a stator as well as a rotor mounted rotatably about an axis of rotation with respect to the stator, the rotor being coupled by way of an angular gearing to the driven shaft. An electrical winding of the stator and/or an electrical winding of the rotor projects in the axial direction, with respect to the axis of rotation, beyond a coil former to form a winding head and the angular gearing is arranged overlapping with the winding head at least in regions, when viewed in the axial direction.

11 Claims, 1 Drawing Sheet

(51) Int. Cl.
  *B60K 1/02* (2006.01)
  *B60K 17/04* (2006.01)

(56) References Cited

U.S. PATENT DOCUMENTS

| | | | | |
|---|---|---|---|---|
| 2,144,218 | A * | 1/1939 | Dunham | F02P 1/005 310/84 |
| 3,178,963 | A * | 4/1965 | Musser | H02K 7/116 74/640 |
| 4,510,395 | A * | 4/1985 | Sohrt | B61C 9/50 290/3 |
| 5,845,732 | A * | 12/1998 | Taniguchi | B60K 1/00 180/65.6 |
| 2015/0090505 | A1 * | 4/2015 | Oriet | B60K 17/16 180/24.04 |

FOREIGN PATENT DOCUMENTS

| | | |
|---|---|---|
| DE | 102011055531 A1 | 5/2012 |
| DE | 102011082012 A1 | 3/2013 |
| DE | 202013011046 U1 | 3/2015 |
| DE | 102014007550 A1 | 11/2015 |
| DE | 102015207074 A1 | 10/2016 |
| EP | 1747969 A1 | 1/2007 |
| FR | 2949393 A1 | 3/2011 |
| JP | 2005-153547 A | 6/2005 |
| WO | 2011/118266 A1 | 9/2011 |

OTHER PUBLICATIONS

The extended European search report dated Feb. 27, 2019, in corresponding European patent application No. 18201217.9 including partial machine-generated English language translation; 13 pgs.
Examination Report dated Oct. 19, 2020 in corresponding European Application No. 18 201 217.9; 10 pages including partial machine-generated English-language translation.
Examination Report dated Jul. 25, 2018 in corresponding German Application No. 102017221389.2; 10 pgs.
Office Action dated Jan. 19, 2021 in corresponding Chinese Application No. 201811438661.7; 8 pages including partial English-language summary.

* cited by examiner

DRIVE MECHANISM AND AXLE DRIVE MECHANISM FOR A MOTOR VEHICLE

FIELD

The invention relates to a drive mechanism for a motor vehicle, with a driven shaft and an electric machine, comprising a stator as well as a rotor mounted rotatably about an axis of rotation with respect to the stator, the rotor being coupled to the driven shaft by way of an angular gearing. The invention moreover relates to an axle drive mechanism for a motor vehicle.

BACKGROUND

The publication U.S. Pat. No. 1,613,053 is known, for example, from the prior art. The latter relates to a starter mechanism that makes available an electrical machine that stands in operative connection with another mechanism by way of an angular gearing.

SUMMARY

The object of the invention is to propose a drive mechanism that has advantages compared to known drive mechanisms, in particular, a compact construction and/or outstanding acoustical properties, and/or that makes possible an excellent mounting of at least one gearing element of the angular gearing.

It is provided in this case that an electrical winding of the stator and/or an electrical winding of the rotor projects, in the axial direction with respect to the axis of rotation, beyond a coil former to form a winding head and the angular gearing is arranged overlapping with the winding head, at least in regions, when viewed in the longitudinal direction.

For example, the drive mechanism is a component of a motor vehicle. In this case, it serves for driving the motor vehicle, i.e., for providing a torque directed at driving the motor vehicle. The drive mechanism provides a driven shaft, on which the driving torque is provided or can be provided. For providing the driving torque, the drive mechanism provides the electrical machine.

The electrical machine can preferably be operated both as a motor and as a generator. In the former case, the electric machine is supplied with electrical energy for providing the driving torque. In this case, the driving torque, for example, may be directed to accelerating or decelerating the motor vehicle. In the generator operation, on the other hand, a torque present on the driven shaft is used to provide electrical energy. This means that mechanical or kinetic energy of the driven shaft is transformed into electrical energy.

The electrical machine provides a stator and a rotor. The rotor is mounted rotatably about the axis of rotation with respect to the stator. For example, the stator and the rotor are arranged at a common machine housing of the electric machine, the stator being preferably rigidly connected to the machine housing, while in contrast, the rotor is mounted rotatably in and/or on the machine housing.

The rotor is operatively connected to the driven shaft, especially in permanent manner. For this, it stands in operative connection with the driven shaft by way of the angular gearing. The angular gearing serves for reversing the direction of the torque provided by the electric machine. Accordingly, the driven shaft is angled with respect to the axis of rotation or even lies askew to it.

In the first case, an axis of rotation of the driven shaft, about which the driven shaft is rotatably mounted, intersects the axis of rotation of the rotor. In the case of the skewed arrangement, the axes of rotation of the driven shaft and the rotor are spaced apart from each other, i.e., they do not intersect each other. The angular gearing, for example, comprises two gearing elements, a first one of the gearing elements being coupled, preferably permanently, to the rotor, and a second one of the gearing elements being coupled to the driven shaft.

The stator or the rotor comprises a coil former as well as an electrical winding that is arranged on the coil former. In other words, the winding is wound on the coil former, so that the winding encloses the coil former preferably multiple times with many winding turns. For example, the coil former has a plurality of pole pieces, each of which is enclosed by the electrical winding or turns of the electrical winding. Of course, multiple electrical windings may also be present, each of the windings being coordinated with at least one of the pole pieces and wound on it. Of course, both the stator and the rotor can each have a coil former which is configured in the manner described.

The electrical winding of the stator or the rotor projects beyond the coil former in the axial direction with respect to the axis of rotation. This projection is also called a winding head. Now, for a space-saving design of the drive mechanism, the angular gearing should overlap with the winding head at least in regions, viewed from the axial direction. The winding head in this case is preferably situated further on the outside than the angular gearing in the radial direction. Especially preferably, it is proposed that the winding head encloses the angular gearing at least in regions in the peripheral direction. For example, the winding head is present on oppositely situated sides of the angular gearing, when viewed in the longitudinal section with respect to the axis of rotation.

In such a configuration of the drive mechanism, the angular gearing comes much closer to the stator or rotor or its coil former than is the case with other configurations of the drive mechanism. Accordingly, the space requirement in the axial direction is reduced when compared to other configurations. Thanks to the close arrangement of the angular gearing at the coil former, furthermore, an excellent mounting can be accomplished for that gearing element of the angular gearing that is coupled to the rotor, whereby this coupling is not present beyond the angular gearing.

If both the rotor and also the stator each have a winding head, then the angular gearing is arranged overlapping with both winding heads, preferably, at least in regions when viewed in the longitudinal direction. The winding head of the rotor may have a shorter dimension in the axial direction in the direction facing away from the rotor than the winding head of the stator. In other words, the winding head of the stator extends beyond the winding head of the rotor in the axial direction.

Another embodiment of the invention provides that the angular gearing comprises at least one conical gear, which is coaxial to the axis of rotation and is arranged overlapping with the winding head in the axial direction. The conical gear constitutes the at least one gearing element of the angular gearing. Preferably, the angular gearing comprises another conical gear in addition to said conical gear, and this additional conical gear meshes with said conical gear, especially in permanent manner.

The conical gear is arranged coaxially to the axis of rotation, whereas the additional conical gear is arranged, for example, coaxially to the axis of rotation of the driven shaft. For a space-saving design of the drive mechanism, the conical gear is arranged in such a way that it overlaps with the winding head in the axial direction. As already explained above, it is preferably provided that the winding head encloses the conical gear at least partly, but especially entirely, in the peripheral direction.

In the context of another preferred embodiment of the invention, it may be provided that the conical gear is coupled rotationally fixed to a drive shaft, which stands in permanent operative connection with the rotor. In other words, the conical gear is coupled to the rotor by way of the drive shaft. This means that the drive shaft, on the one hand, is coupled in rotationally fixed manner to the conical gear and, on the other hand, is attached to the rotor.

The drive shaft is preferably arranged coaxially to the rotor, i.e., it has an axis of rotation that coincides with the axis of rotation of the rotor. For example, the drive shaft may be coupled directly to the rotor, so that the drive shaft and the rotor are in a fixed speed connection to each other and, accordingly, always have the same rotational speed. With the help of the drive shaft, an excellent mounting of the conical gear can be achieved.

One enhancement of the invention provides that the drive shaft is mounted rotatably by means of a bearing, while the bearing is situated between the conical gear and the coil former in the axial direction. The bearing, for example, is a plain bearing or—preferably—a roller bearing. The bearing serves for mounting the drive shaft and preferably, in addition, for mounting the conical gear of the angular gearing. For this purpose, the bearing is arranged between the conical gear and the coil former in the axial direction.

Thus, it is especially preferably provided that the bearing is arranged at least partly, but especially entirely overlapping with the winding head, when viewed in the longitudinal direction. In other words, the bearing is enclosed in the peripheral direction at least in regions, but preferably entirely, by the winding head. Hence, no additional design space is needed for the arrangement of the bearing in the axial direction, so that, accordingly, the drive mechanism has an especially compact design.

Another preferred embodiment of the invention provides that the angular gearing additionally has another conical gear meshing with the conical gear, this additional conical gear being mounted rotatably and angled or askew with respect to the axis of rotation, and is coupled rotationally fixed to the driven shaft. In summary, therefore, the angular gearing comprises the conical gear and the additional conical gear. The conical gear is situated on the rotor side and the additional conical gear on the side of the driven shaft. The conical gear and the additional conical gear are each mounted rotatably about an axis of rotation, and the two axes of rotation are angled to each other or are askew to each other. The axis of rotation of the conical gear preferably coincides with the axis of rotation of the rotor, while the axis of rotation of the additional conical gear coincides especially preferably with the axis of rotation of the driven shaft.

The additional conical gear is coupled in rotationally fixed manner to the driven shaft, for example, it sits directly on the driven shaft. However, it may also be provided that the additional conical gear is operatively connected to the driven shaft by way of a differential gearing, such as an axle differential gearing. For example, the additional conical gear is connected to a differential gearing cage of the differential gearing, especially in rigid and/or permanent manner. For example, the additional conical gear is formed by the differential gearing cage. The integration of the angular gearing, which comprises the conical gear and the additional conical gear, in the drive mechanism in such a way that the axial overlapping with the winding head is present, makes possible an especially compact embodiment of the drive mechanism.

Another embodiment of the invention provides that the additional conical gear likewise overlaps with the winding head, when viewed in the longitudinal direction. Thus, especially preferably, the additional conical gear also engages with the conical head or impinges on the coil former in such a way that it is at least partly enclosed by the winding head in the peripheral direction. This applies especially preferably to an outer edge of the additional conical gear.

With such a configuration, a large portion of the conical gear may overlap with the winding head. For example, at least 30%, at least 40%, at least 50%, at least 60%, at least 70% or at least 75% of the conical gear overlaps with the winding head, when viewed in the longitudinal direction. Thanks to the overlapping of the additional conical gear with the winding head, the structural length of the drive mechanism in the axial direction is thus further decreased.

Another embodiment of the invention provides that the drive shaft is coupled to the rotor by a planetary gearing, which is situated on the side of the rotor opposite the angular gearing, in the axial direction. The drive shaft is thus not coupled directly to the rotor. Instead, this coupling occurs only indirectly by way of the planetary gearing. The planetary gearing has multiple gearing elements, the drive shaft being coupled to a first gearing element and the rotor to a second gearing element. The planetary gearing may also be called an epicyclical gear or an epicyclical gearing.

The planetary gearing is arranged on the side of the rotor opposite the angular gearing. Accordingly, the drive shaft passes through the coil former of the stator or rotor in the axial direction, preferably entirely through it, so as to be attached to or coupled with the planetary gearing, on the one hand, and the conical gear, on the other hand. This results in an excellent bracing of the drive shaft thanks to the large bearing distance between the aforementioned bearing and the planetary gearing or an additional bearing that serves for mounting the drive shaft on the side of the coil former facing away from the bearing.

The planetary gearing serves for a reduction in rotational speed, so that the drive shaft has a lower rotational speed than the rotor. This results in a low rotational speed for the angular gearing, so that there is less noise production as compared to other drive mechanisms in which the angular gearing has the same rotational speed as the rotor. The drive mechanism according to the embodiments in the context of this description thus has distinct benefits as far as acoustics are concerned.

Another embodiment of the invention provides that the rotor or the stator has another winding head on its side facing away from the first winding head, which projects beyond the coil former, and the planetary gearing is situated at least partly overlapping with the additional winding head in the axial direction. The electrical winding of the rotor or the stator thus extends beyond the coil former also at the side facing away from the winding head in the axial direction with respect to the axis of rotation and forms there the additional winding head.

Now, for a further reduction in the dimensions of the drive mechanism in the axial direction, the planetary gearing is arranged overlapping with the additional winding head in the axial direction. By analogy with the remarks concerning the winding head and the angular gearing, this means that the additional winding head encloses the planetary gearing at least in regions, but preferably entirely, in the peripheral direction. For example, in terms of its dimension in the axial direction, the planetary gearing overlaps with the additional winding head by at least 30%, at least 40%, at least 50%, at least 60%, at least 70% or at least 75%.

Finally, in the context of another preferred embodiment of the invention, it may be provided that the drive shaft is coupled in a rotationally fixed manner to a first gearing element of the planetary gearing and the rotor is coupled in a rotationally fixed manner to a second gearing element of the planetary gearing. This has already been pointed out above. The planetary gearing usually comprises three gearing elements, namely, a sun gear, a ring gear and a planet gear carrier, on which at least one planet gear is rotatably mounted. The planet gear meshes, on the one hand, with the ring gear and, on the other hand, with the sun gear.

The first gearing element, for example, is the sun gear, while the second gearing element is the ring gear or the planet gear carrier. The respective third gearing element is preferably fixed, especially in regard to the machine housing, so that a definite transmission ratio is present between the first gearing element and the second gearing element, which can also be called the fixed transmission ratio. Preferably, the ring gear is used as the second gearing element, so that the planet gear carrier is accordingly fixed. The planet gear carrier may also be called a web.

The integration of the planetary gearing in the drive mechanism in terms of the torque transmitted between the rotor and the angular gearing has the already mentioned advantage that the rotational speed of the angular gearing is relatively low. Thanks to the arrangement of the planetary gearing so that it overlaps with the additional winding head, this advantage is realized with an extremely compact drive mechanism.

The invention furthermore relates to an axle drive mechanism for a motor vehicle, having multiple drive mechanisms, especially drive mechanisms according to the embodiments in the context of this description, wherein each of the drive mechanisms has a driven shaft and an electric machine, comprising a stator as well as a rotor mounted rotatably about an axis of rotation with respect to the stator, which is coupled by an angular gearing to the driven shaft. It is provided that in each of the drive mechanisms an electrical winding of the stator and/or an electrical winding of the rotor projects in the axial direction, with respect to the axis of rotation, beyond a coil former to form a winding head and the angular gearing is arranged overlapping with the winding head at least in regions, when viewed in the longitudinal direction.

The advantages of such a configuration of the drive mechanisms or the axle drive mechanism have already been pointed out. Both the axle drive mechanism and its drive mechanisms can be enhanced according to the remarks in the context of this description, so that reference is made to these in this regard.

The axle drive mechanism serves for driving the wheels of a wheel axle of the motor vehicle. Preferably, one of the drive mechanisms is coordinated with each wheel of the wheel axle, so that with the aid of the axle drive mechanism, a single-wheel drive of the wheels is realized. For example, each wheel is coupled to the driven shaft of the respective drive mechanism, especially in a rigid and/or permanent manner. With the aid of the axle drive mechanism or the drive mechanisms, such a single-wheel drive can thus be implemented in an especially space-saving and acoustically advantageous manner.

BRIEF DESCRIPTION OF THE DRAWINGS

The invention shall be explained more closely below with the aid of exemplary embodiments represented in the drawing, without resulting in limiting the invention. Shown therein are.

DETAILED DESCRIPTION

Figure 1:
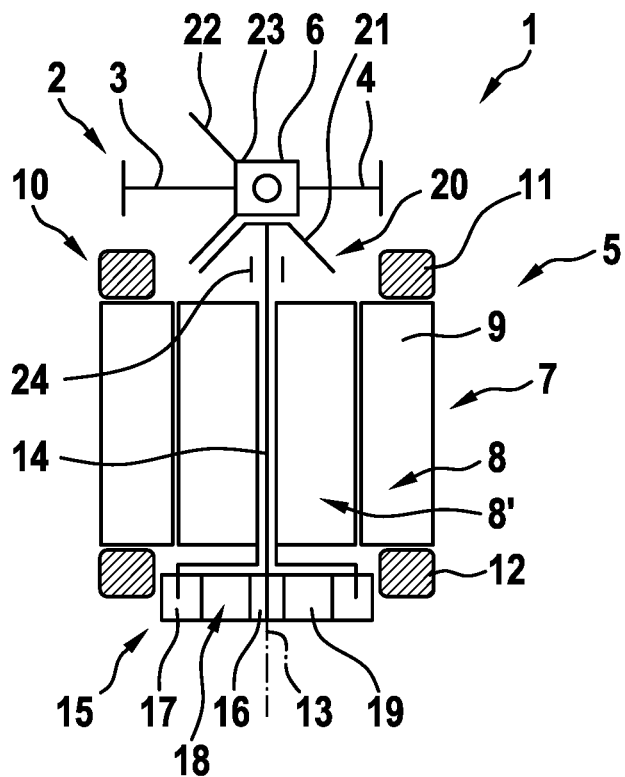
FIG. 1 a schematic representation of an axle drive mechanism in a first embodiment, and FIG. 2 a schematic representation of the axle drive mechanism in a second embodiment.

FIG. 1 shows a schematic representation of an axle drive mechanism 1 for a motor vehicle, serving for the driving of a wheel axle 2. The wheel axle 2 comprises two sub-axles 3 and 4, each of the sub-axles 3 and 4 being coupled to one wheel of the wheel axle 2, preferably in a rigid and/or permanent manner. The axle drive mechanism 1 comprises a drive mechanism 5, serving for the driving of the wheel axle 2. For this, the drive mechanism 5 is coupled by way of a differential gearing 6 to the wheel axle 2. The differential gearing 6 may accordingly also be called an axle differential gearing. The differential gearing 6 couples the drive mechanism 5 to both the sub-axle [3] and the sub-axle 4. The sub-axles 3 and 4 accordingly constitute output shafts of the differential gearing 6.

The drive mechanism 5 has an electrical machine 7, comprising a stator 8 and a rotor 8'. The stator 8 has a coil former 9, on which an electrical winding 10 or multiple electrical windings 10 are wound. The electrical winding 10 forms a winding head 11 at one end of the coil former 9 and another winding head 12 at the other end of the coil former 9. In other words, the electrical winding 10 extends at both ends beyond the coil former 9 in the axial direction with respect to an axis of rotation 13 of the rotor 8' to form the winding heads 11 and 12.

The rotor 8' is coupled to a drive shaft 14, namely, in the exemplary embodiment shown here, by way of a planetary gearing 15. The planetary gearing 15 has a first gearing element 16, a second gearing element 17 and a third gearing element 18. In the exemplary embodiment shown here, the first gearing element 16 is present as a sun gear, the second gearing element 17 as a ring gear and the third gearing element 18 as a planet gear carrier. On the planet gear carrier is rotatably mounted at least one planet gear 19, which meshes, on the one hand, with the sun gear and, on the other hand, with the ring gear.

In the exemplary embodiment shown here, the planet gear carrier or the third gearing element 18 is fixed. The first gearing element 16 is coupled directly to the drive shaft 14, namely, in rigid and/or permanent manner. The third gearing element 18, on the other hand, is coupled directly to the rotor 8', preferably likewise in rigid and/or permanent manner.

At its end facing away from the planetary gearing 15, the drive shaft 14 is connected to an angular gearing 20, comprising a conical gear 21 and another conical gear 22. The conical gears 21 and 22 mesh with each other. The conical gear 22 is arranged on a driven shaft 23 of the drive mechanism 5 and is connected to it in rotationally fixed manner. In the exemplary embodiment shown here, the driven shaft 23 is represented by a differential gear basket of the differential gearing 6. At the end of the stator 8 or the rotor 8' or the end of the coil former 9 facing toward the angular gearing 20, the drive shaft 14 is rotatably mounted by means of a bearing 24.

In order to realize an especially compact design of the drive mechanism 5, it is provided that the angular gearing 20 is arranged overlapping with the winding head 11, at least in regions, when viewed in the longitudinal direction. Preferably, it is provided that the planetary gearing 15 is arranged in axial overlapping with the additional winding head 12, at least in regions in the axial direction.

This accomplishes an especially compact embodiment of the drive mechanism 5 and hence of the axle drive mechanism 1 in the axial direction. The bearing 24, which is arranged in the axial direction between the conical gear 21 and the coil former 9, likewise also overlaps with the winding head 11, preferably completely.

Figure 2:
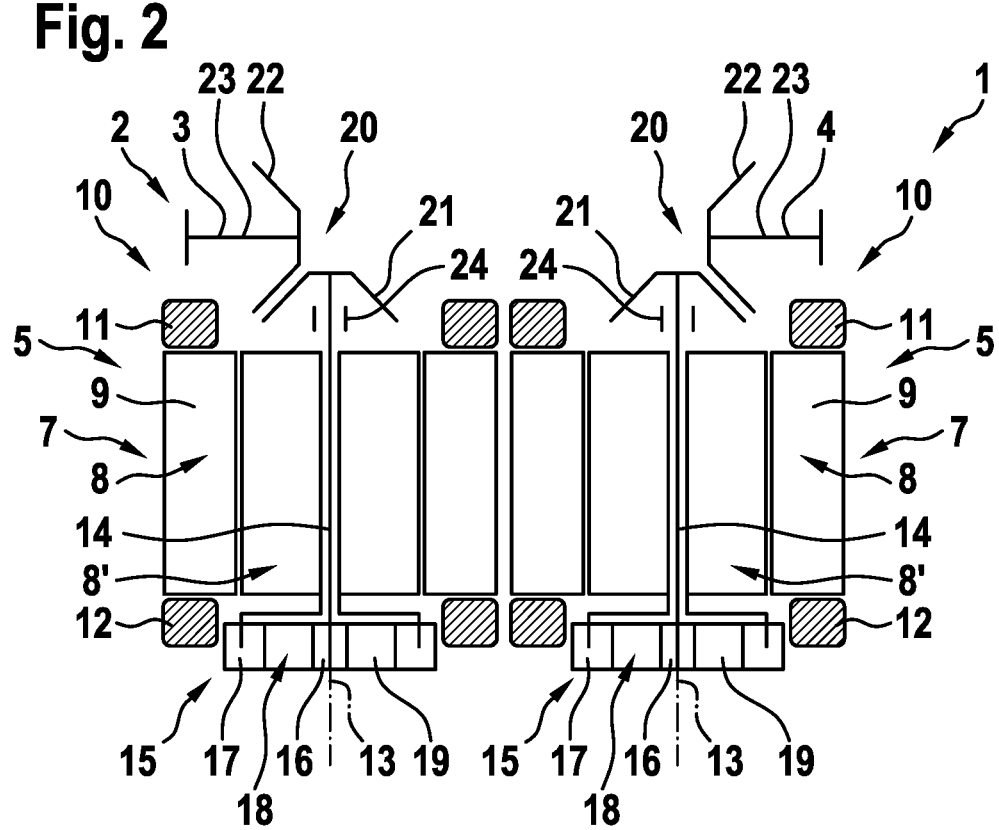

FIG. 2 shows a schematic representation of the axle drive mechanism 1 in a second embodiment. Here, the axle drive mechanism 1 has multiple axle drive mechanisms 5, namely, in the embodiment represented here, two axle drive mechanisms 5. Basically, the axle drive mechanism 1 of the second embodiment is similar in design to the axle drive mechanism 1 of the first embodiment, so that in the following only the differences will be discussed.

These lie substantially in the fact that the axle drive mechanism 1 has two axle drive mechanisms 5. Each of the drive mechanisms 5 is associated with one of the sub-axles 3 and 4, so that the differential gearing 6 is omitted. The sub-axles 3 and 4 now each constitute the driven shaft 23 of the corresponding drive mechanism 5. Accordingly, the axle drive mechanism 1 in its second embodiment forms a single-wheel drive for the motor vehicle. In regard to the further configuration of the axle drive mechanism 1 in its second embodiment, refer to the remarks in the context of this description, especially also regarding the first embodiment. These are substantially applicable here by analogy.

The invention claimed is:

1. A drive mechanism for a motor vehicle, comprising:
a driven shaft and an electric machine, including a stator as well as a rotor mounted rotatably about an axis of rotation with respect to the stator, the rotor being coupled to the driven shaft by way of an angular gearing,
wherein at least one of an electrical winding of the stator and an electrical winding of the rotor projects in the axial direction with respect to the axis of rotation beyond a coil former to form a first winding head, and the angular gearing is arranged at least partly overlapping with the first winding head in the axial direction when viewed longitudinally,
wherein the angular gearing has at least one conical gear, which is present coaxial to the axis of rotation and is arranged overlapping with the first winding head in the axial direction when viewed longitudinally.

2. The drive mechanism as claimed in claim 1, wherein the conical gear is coupled rotationally fixed to a drive shaft, which stands in permanent operative connection with the rotor.

3. The drive mechanism as claimed in claim 2, wherein the drive shaft is mounted rotatably by a bearing, wherein the bearing is arranged between the conical gear and the coil former in the axial direction when viewed longitudinally.

4. The drive mechanism as claimed in claim 2, wherein the drive shaft is coupled by a planetary gearing to the rotor, this planetary gearing being arranged on the side of the rotor lying opposite the angular gearing, in the axial direction.

5. The drive mechanism as claimed in claim 4, wherein at least one of the rotor and the stator has a second winding head on its side facing away from the first winding head, the second winding head projecting beyond the coil former in the axial direction, wherein the planetary gearing is arranged at least partly overlapping with the second winding head in the axial direction when viewed longitudinally.

6. The drive mechanism as claimed in claim 5, wherein both the stator and the rotor each have respective second winding heads, which each face away from the first winding head, project in the axial direction beyond the coil former in the axial direction, and at least partly overlap with the planetary gearing in the axial direction when viewed longitudinally.

7. The drive mechanism as claimed in claim 4, wherein the drive shaft is coupled rotationally fixed to a first gearing element of the planetary gearing and the rotor is coupled rotationally fixed to a second gearing element of the planetary gearing.

8. The drive mechanism as claimed in claim 1, wherein the angular gearing additionally has an additional conical gear meshing with the at least one conical gear, the additional gear being mounted rotatably and angled or askew with respect to the axis of rotation, and is coupled rotationally fixed to the driven shaft.

9. The drive mechanism as claimed in claim 8, wherein the additional conical gear likewise overlaps with the first winding head in the axial direction when viewed longitudinally.

10. The drive mechanism as claimed in claim 1, wherein both the electrical winding of the stator and the electrical winding of the rotor project in the axial direction beyond the coil former to form respective first winding heads, which each at least partly overlap with the angular gearing in the axial direction when viewed longitudinally.

11. An axle drive mechanism for a motor vehicle, comprising:
a plurality of drive mechanisms,
wherein each of the drive mechanisms provides a driven shaft and an electric machine, including a stator as well as a rotor mounted rotatably about an axis of rotation with respect to the stator, the rotor being coupled by way of an angular gearing to the driven shaft,
wherein in each of the drive mechanisms, at least one of an electrical winding of the stator and an electrical winding of the rotor projects in an axial direction, with respect to the axis of rotation, beyond a coil former to form a first winding head, and the angular gearing is arranged at least partly overlapping with the first winding head in the axial direction when viewed longitudinally,
wherein, in each of the drive mechanisms, the angular gearing has at least one conical gear, which is present coaxial to the axis of rotation of the rotor and is arranged overlapping with the first winding head in the axial direction when viewed longitudinally.

* * * * *